United States Patent
Buyrn (10) Patent No.: US 10,515,100 B2
(45) Date of Patent: Dec. 24, 2019

(54) SYSTEMS AND METHODS FOR INTERACTIVE BOUNDARY MAPPING (71) Applicant: SCHOOL MAPS ONLINE LLC, Westminster, CO (US)

(72) Inventor: Curtis Buyrn, Westminster, CO (US)

(73) Assignee: SCHOOL MAPS ONLINE LLC, Westminster, CO (US)

( * ) Notice: Subject to any disclaimer, the term of this patent is extended or adjusted under 35 U.S.C. 154(b) by 611 days.

(21) Appl. No.: 14/866,408

(22) Filed: Sep. 25, 2015

(65) Prior Publication Data
US 2016/0092077 A1    Mar. 31, 2016

Related U.S. Application Data (60) Provisional application No. 62/055,262, filed on Sep. 25, 2014.

(51) Int. Cl.
G06F 16/29    (2019.01)
G06T 11/20    (2006.01)

(52) U.S. Cl.
CPC .............. *G06F 16/29* (2019.01); *G06T 11/20* (2013.01)

(58) Field of Classification Search
None
See application file for complete search history.

(56) References Cited

U.S. PATENT DOCUMENTS

| | | | | |
|---|---|---|---|---|
| 6,577,714 B1 * | 6/2003 | Darcie | ............. | G06F 17/30241 379/100.01 |
| 8,340,691 B1 * | 12/2012 | Starenky | ............. | G01C 21/28 455/404.2 |
| 2001/0035880 A1 * | 11/2001 | Musatov | ............. | G06F 3/04886 715/764 |
| 2005/0114354 A1 * | 5/2005 | Singh | ............. | G09B 29/106 |
| 2006/0116817 A1 * | 6/2006 | Salmre | ............. | G06F 17/30241 701/426 |
| 2007/0167174 A1 * | 7/2007 | Halcrow | ............. | H04W 48/16 455/456.2 |
| 2008/0059889 A1 * | 3/2008 | Parker | ............. | G06F 17/30241 715/748 |
| 2009/0138826 A1 * | 5/2009 | Barros | ............. | G06Q 30/0641 715/841 |
| 2009/0234573 A1 * | 9/2009 | Notarantonio | ......... | G06Q 30/02 701/533 |

(Continued)

OTHER PUBLICATIONS

Tutorial dated Dec. 2012 retrieved from [http://www.esri.com/news/arcwatch/1212/learn-to-use-hidden-layers-for-web-map-popup-windows.html] on [Oct. 16, 2018]. (Year: 2012).*

*Primary Examiner* — Amy M Levy (74) *Attorney, Agent, or Firm* — Polsinelli PC (57) ABSTRACT Implementations described and claimed herein provide systems and methods for generating interactive boundaries of service sites for a selected geographic location. In one implementation, a primary boundary enclosing a geographical region is determined. A primary layer is generated based on the primary boundary. One or more secondary layers are generated, and each secondary layer has a plurality of secondary boundaries each defined based on a service location. A union layer is generated based on the primary layer and the one or more secondary layers. The union layer has a plurality of union boundaries corresponding to a subset of the service sites.

13 Claims, 8 Drawing Sheets (56) References Cited

U.S. PATENT DOCUMENTS

| | | | |
|---|---|---|---|
| 2011/0074767 A1* | 3/2011 | Bezy | G06T 19/00 345/419 |
| 2011/0270705 A1* | 11/2011 | Parker | G06Q 30/0603 705/26.61 |
| 2013/0018704 A1* | 1/2013 | Liu | G06F 17/30241 705/7.38 |
| 2013/0132375 A1* | 5/2013 | Jones | G06F 3/04815 707/722 |
| 2013/0151136 A1* | 6/2013 | Oh | G01S 19/14 701/300 |
| 2014/0080428 A1* | 3/2014 | Rhoads | G06F 17/30241 455/88 |
| 2014/0218400 A1* | 8/2014 | O'Toole | G06Q 50/16 345/634 |
| 2014/0222908 A1* | 8/2014 | Park | G06Q 10/10 709/204 |
| 2014/0280180 A1* | 9/2014 | Edecker | G06F 16/9535 707/740 |
| 2014/0333651 A1* | 11/2014 | Cervelli | G06F 3/0481 345/589 |
| 2014/0337772 A1* | 11/2014 | Cervelli | G06F 3/0481 715/766 |
| 2015/0019543 A1* | 1/2015 | Dzubay | G06F 17/30241 707/724 |

\* cited by examiner

SYSTEMS AND METHODS FOR INTERACTIVE BOUNDARY MAPPING

CROSS-REFERENCE TO RELATED APPLICATIONS

The present application claims benefit of priority under 35 U.S.C § 119 to U.S. Provisional Patent Application No. 62/055,262, entitled "SYSTEMS AND METHODS FOR INTERACTIVE BOUNDARY MAPPING" and filed on Sep. 25, 2014, which is specifically incorporated by reference in their entirety herein.

TECHNICAL FIELD

Aspects of the present disclosure relate to geographic information system (GIS) services, interactive boundary mapping, and the identification of service sites for a selected geographical location, among other features and advantages, and in particular to the generation of interactive school boundaries and identification of schools of attendance for a selected geographical location.

BACKGROUND

School districts are public school systems that provide regular, special, and/or vocational education services for children in pre-kindergarten through 12th grade. The United States has more than 14,000 public school districts and spends more than $500 billion on public elementary and secondary education each year. However, the quality of education, the level of student achievement attributable to a school district (or individual schools within a district), the availability and quality of after school programs and sports, and the like tend to vary dramatically among the various school districts and individual schools within each district. As such, in selecting a location for a home, the school district to which the home belongs, as well as the individual schools of attendance within the school district for the home, are often primary driving forces behind the determination of where to live for many families and/or homebuyers.

Despite the emphasis on the importance of selecting a location for a home based on the quality of schools, identifying the school district and schools of attendance for a particular address can be a challenging and frustrating endeavor. Public school systems in the United States are locally administered, and their geographic structure varies by state and region. For example, some districts in the Mid-Atlantic and New England states follow county, township, or city boundaries, while districts in the Midwest and Western states are generally independent of municipal boundaries and frequently intersect statistical areas like Census tracts and block groups. Furthermore, school boundaries may need adjustment each school year at the district level or at the individual school level to accommodate enrollment changes, adding or closing schools, new residential developments, and the like.

Many school districts provide PDF's of the district boundaries by school year. However, PDF's are generally not user friendly and fail to provide the information most users are searching for, including schools of attendance for a particular address. Further exacerbating these challenges, many boundary maps available to the community, prospective residents, and parents are outdated or otherwise inaccurate. Due to the changing and often complex nature of school boundaries and lack of reliable and easily accessible resources, school districts and individual schools are often queried to provide schools of attendance for a particular residence, thereby detracting from school resources that could otherwise be focused on education, as well as making the process of selecting a residence for families tedious and time consuming.

It is with these observations in mind, among others, that various aspects of the present disclosure were conceived and developed.

SUMMARY

Implementations described and claimed herein address the foregoing problems, among others, by providing systems and methods for generating interactive boundaries of service sites for a selected geographic location. In one implementation, a primary boundary enclosing a geographical region is determined. A primary layer is generated based on the primary boundary. One or more secondary layers are generated, and each secondary layer has a plurality of secondary boundaries each defined based on a service location. A union layer is generated based on the primary layer and the one or more secondary layers. The union layer has a plurality of union boundaries corresponding to a subset of the service sites.

In another implementation, a union layer within a primary boundary is obtained based on a plurality of secondary boundaries. Each of the secondary boundaries is defined based on a service location. A selection of a geographical location is received. The geographical location is intersected with the union layer. One or more of the service sites for the geographical location are identified based on the intersection.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Geographic information system (GIS) services generally involve capturing, storing, analyzing, manipulating, sharing, managing, and displaying information spatially referenced to a geographical framework. Stated differently, GIS involves a framework for location-enabled services utilizing layers to provide an integrated view of an interrelation of often disparate information relative to a mapped geography. Aspects of the present disclosure utilize GIS services to provide dynamic and interactive boundaries where a user may identify service sites for a selected geographical location.

Generally, an intuitive user interface generated by an interactive boundary mapper is provided where a user enters a geographic location (e.g., an address, coordinates, etc.) and service sites for the selected geographic location are returned. A listing of service sites and color coded service boundaries are provided, as well as service site locations relative to the address, animated service site markers, directions to the service sites from the address, and other information about the site and/or services. If the user enters the geographic location manually, the location being searched for may be anticipated by autocompleting an address or location as it is entered. As an alternative to entering a geographic location manually, a user may hover the mouse icon over the map in a particular geographic location, touch a particular geographic location on the map using a tactile touchscreen, and/or utilize Global Positioning System (GPS) services, each of which will automatically present the service sites for that location. Instant updates may be provided to display map options without reloading the webpage where the user selects and deselects options.

The interactive boundary mapper may be generated for execution in various types of client platforms (e.g., service site platforms) to provide a client specific interface. Stated differently, the interactive boundary mapper is platform independent, such that it is capable of execution in different operating systems and computing environments. In some cases, the interactive boundary mapper is deployed in an administration platform accessible over a network. Alternatively, the interactive boundary mapper is deployed in each client platform. The interactive boundary mapper may be customized based on client selections and deployed using a script generated based on the client selections. For example, the client selections may include: one or more selected layers from which to generate the interactive boundaries and corresponding information, whether to include a choice zone where a user may choose among service sites, and/or the like.

In one particular aspect, dynamic and interactive school boundaries are generated and displayed on an intuitive user interface where a user may identify schools of attendance for a particular geographical location. The user selects a geographical location, such as a residence. The user may search for a geographical location by specific geographical location (e.g., an address, coordinates, etc.), a general area, specific service sites (e.g., specific schools), and/or the like. A interactive boundary mapper receives the selected geographical location and determines whether the location is within a particular boundary (e.g., a school district). If the selected geographical location is outside the boundary, a pin is returned showing the location on a map with a notification indicating that the geographical location is outside the boundary. If the selected geographical location is within the boundary, the interactive boundary mapper pierces an invisible union layer with a pin corresponding to the geographical location. The union layer generally is a union of respective layers, each with boundaries corresponding to a particular type of service location. For example, the union layer may be a union of layers for the school district's respective schools, with each layer having boundaries within the school district for a particular school level (e.g., elementary school, middle school, and high school boundaries). A pin corresponding to the geographical location pierces this union layer, thereby identifying the schools of attendance at each level for the geographical location. The pin is annotated with a description identifying the schools of attendance. As various options are selected and deselected or the geographical location is modified, real time feedback is provided showing the schools of attendance.

The GIS platform provides dynamic and interactive school boundaries where a user may identify schools of attendance for a particular residence. The platform may be customized to include various layers of boundaries, such as current boundaries and future boundaries (due to take effect at the start of an upcoming schools year), transfer schools (for closing schools), prospective boundaries (options for new boundaries) with an option for input from the community, and the like. The platform may be hosted by the school district server with all the information accessible from one webpage configured to match the look and feel of the web presence of the school district, thereby providing a seamless user experience while maintaining the image of the school district.

The various systems and methods disclosed herein generally provide for generating dynamic and interactive boundaries where a user may identify service sites for a selected geographical location. The example implementations discussed herein reference school districts and schools of attendance. However, it will be appreciated by those skilled in the art that the presently disclosed technology is applicable to other boundaries, information, and service sites. For example, the presently disclosed technology may be implemented in the context of: property, county, and township boundaries; time zone boundaries; boundaries of service for businesses (e.g., delivery boundaries); human-driven and/or vehicle-driven transportation boundaries, paths, and routes; and the like.

The systems and methods may be used by a real estate business or by individual users to assist prospective buyers in choosing a home. As a user explores various homes, the interactive boundary mapper may detect the particular geographic location of the user using GPS or similar location services to update the schools of attendance as the user moves from home to home. The systems and methods may further be used to identify service boundaries for which a hospital or other service provider is responsible or services. Universities may utilize the systems and methods to identify bike paths, bus routes, or other transportation information to students based on a selected geographical location. Further, emergency service providers (e.g., police stations, fire stations, medical providers, etc.) or devices (e.g., emergency phone stations, life saving devices, etc.) may be identified for the selected geographical location.

Figure 1:
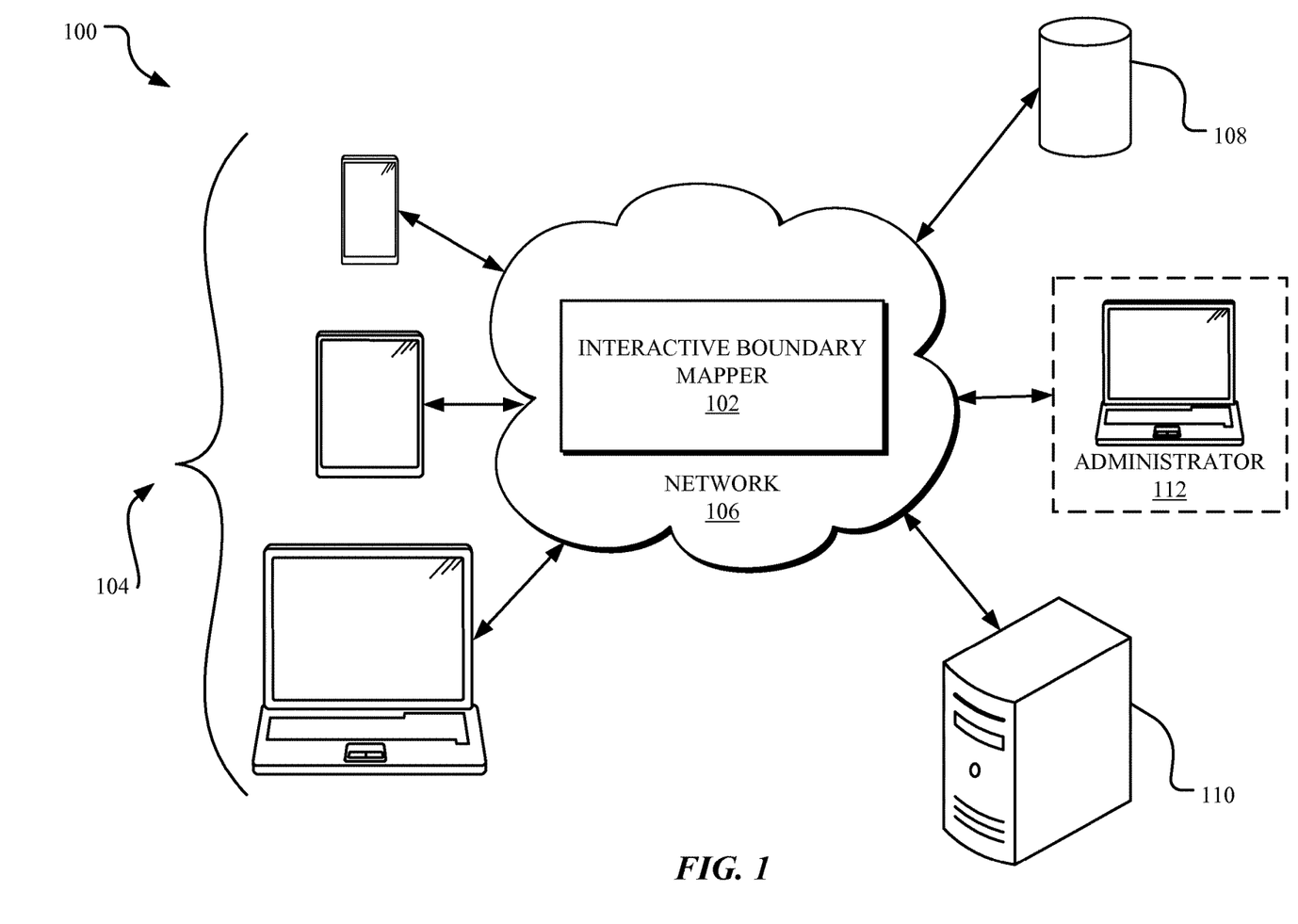
FIG. 1 is an example network environment, including an interactive boundary mapper running on a server or other computing device coupled with a network, for generating interactive boundaries and identifying service sites for a selected geographical location.

For a detailed description of an example network environment 100 for generating dynamic and interactive boundaries where a user may identify service sites for a selected geographical location, reference is made to FIG. 1.

In one implementation, a user accesses and interacts with an interactive boundary mapper 102 using a user device 104 to generate dynamic and interactive boundaries via a network 106 (e.g., the Internet). The user may be, for example, a prospective resident in a particular school district, a parent, a community resident in the school district, or any other user seeking boundary information or service boundaries for service sites (e.g., school boundaries, schools of attendance, delivery or other service boundaries for a business, time zones for a geographic area, real property boundaries, medical provider boundaries, emergency service boundaries, transportation routes, etc.).

The user device 104 is generally any form of computing device capable of interacting with the network 106, such as a personal computer, terminal, workstation, laptop, mobile device, smartphone, tablet, multimedia console, set top box, and/or the like. The network 106 is used by one or more computing or data storage devices (e.g., one or more databases 108 or other computing units described herein) for implementing the interactive boundary mapper 102 and other services, applications, or modules in the network environment 100.

In one implementation, the network 106 includes at least one server 110 hosting a website or an application that the user may visit to access the interactive boundary mapper 102 and/or other network components. The server 110 may be a single server, a plurality of servers with each such server being a physical server or a virtual machine, or a collection of both physical servers and virtual machines. In another implementation, a cloud hosts one or more components of the network environment 100. The user devices 104, the server 110, and other resources connected to the network 106 may access one or more other servers to access to one or more websites, applications, web services interfaces, storage devices, computing devices, or the like that are used for generating dynamic and interactive boundaries and identifying service sites. The server 110 may also host a search engine that the interactive boundary mapper 102 uses for accessing, searching for, and modifying boundary data, geospatial data, service information, school information, GIS layers, and other data.

The interactive boundary mapper 102 may be written in a computer programing language (e.g., JavaScript™) enabling implementation in any environment, platform, or content management system. As such, in one implementation, the server 110 hosts a website or application for a particular school district from which the interactive boundary mapper 102 is accessible to a user via the network 106, and the interactive boundary mapper 102 is customized for the particular school district. An administrator 112 may configure the interactive boundary mapper 102 for the particular school district and deploy the interactive boundary mapper 102 on the server 110 for the particular school district. The administrator 112 may maintain and update the interactive boundary mapper 102 after deployment to ensure that the user is accessing current data, including the interactive school boundaries and schools of attendance. In another implementation, the interactive boundary mapper 102 provides dynamic and interactive boundaries for a plurality of school districts, such that a user may select any geographical location and find schools of attendance and school district boundary lines corresponding to the selected geographical location.

In one implementation, the user device 104 is a mobile device (e.g., a smart phone) with GPS capabilities. The interactive boundary mapper 102 utilizes GPS location data for the user device 104 and automatically selects a geographical location based on a current location of the user device 104. Using the selected geographical location, the interactive boundary mapper 102 identifies schools of attendance and the boundary of those schools of attendance. As the location of the user device 104 changes, the interactive boundary mapper 102 obtains current GPS location data to update the selected geographical location and thus the schools of attendance.

Figure 2:
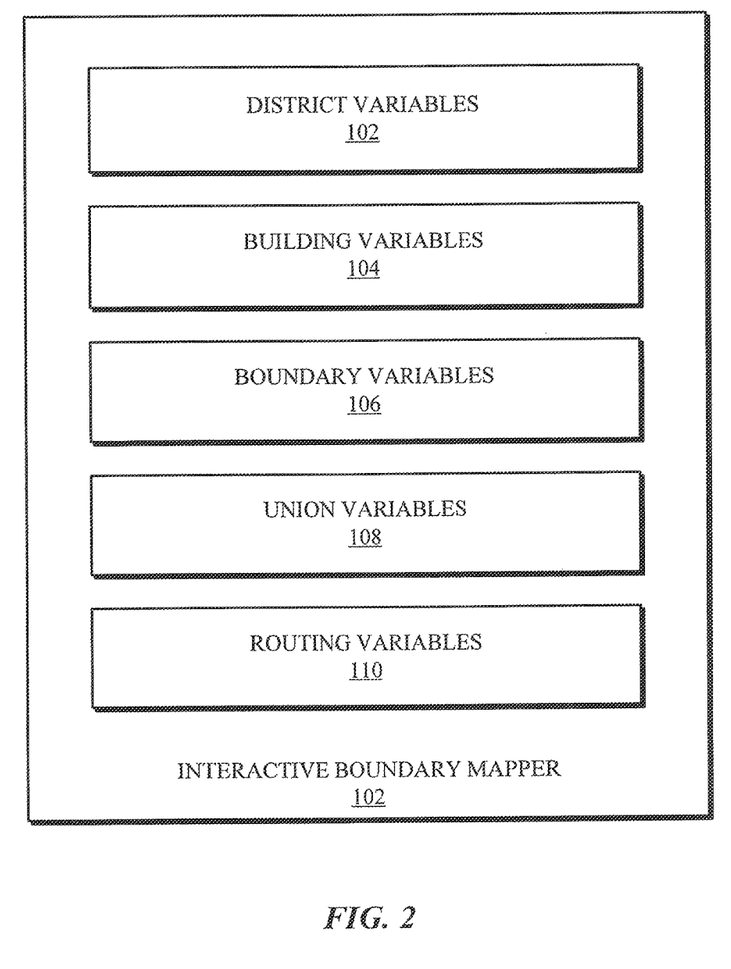
FIG. 2 illustrates example layers the interactive boundary mapper uses to generate the interactive boundaries and identifying service sites for a selected geographical location.

Referring to FIGS. 1 and 2, in one implementation, the interactive boundary mapper 102 includes at least one consolidated, obfuscated file hosted by the server 110 for generating dynamic and interactive school boundaries from which schools of attendance for a particular geographic location, such as an address, may be identified. Stated differently, data corresponding to various layers may be maintained in separate files and consolidated into one obfuscated file for deployment on the server 110.

In one implementation, the interactive boundary mapper 102 may leverage a mapping service, such as Google Maps™ Engine, which provides a means to store geographic data (e.g., vector and/or raster (imagery) files) and to layer that data on top of the Google™ base map. The interactive boundary mapper 102 may include or communicate via an Application Programming Interface (API), for example, to upload geographic data into the Google Maps™ Engine, as well as for processing, maintaining, and associating the data with the Google Maps™ Engine components that interact with the Google™ map. In another implementation, various mapping data and components and geographic data are stored in the database 108 and executed by the server 110.

The interactive boundary mapper 102 includes variables corresponding to functionality of various layers and the interaction of those layers with each other and a geographic mapping engine (e.g., Google Maps™ Engine) to generate the dynamic and interactive boundaries. In one implementation, the variables include, without limitation, district variables 202, building variables 204, boundary variables 206, union variables 208, and routing variables 210. The interactive boundary mapper 102 may include other variables describing the behavior of the interactive boundary mapper 102. For example, there may be variables directed at geographic district center, zoom level, paths for files, customized text, base color, canvas size, font, point size, tracking information, page loading behavior, data corresponding to customized layers, and the like.

The district variables 202 include data corresponding to the schools and education levels in a school district, such as the names of the various schools that are part of the school district and the various grade levels (e.g., elementary, middle, and high).

The building variables 204 include data for the individual schools, such as addresses, contact information, website links, feeder systems, and the like. The route variables 210 describe various line or routing information, such as public transportation routes, school bus routes and stops, walking routes, and the like, which may be used to coordinate transportation for a child to and from school, after school activities, and other locations or events.

The boundary variables 206 include descriptions of polygons, which are generally shapes in geographic areas that may be converted to geographical coordinates to generate and display boundary layers. The boundary layers may include, without limitation, a primary boundary layer and secondary boundary layers. For example, the primary boundary layer may include boundaries of one or more school districts, and the secondary boundary layers may include boundaries for schools at different education levels, such as an elementary school layer with boundaries for one or more elementary schools, a middle school layer with boundaries for one or more middle schools, and a high school layer with boundaries for one or more high schools.

The union variables 208 include descriptions of the district and union polygons to generate a union layer. Stated differently, the union variables 208 describe the geographic coordinates of the various boundaries and how the information is associated with those coordinates. The union layer is layered over a geographical map layer (e.g., Google Maps™) and includes an interrelationship of the various primary and secondary boundary layers and associated information.

To determine schools of attendance for a particular residence and/or see the various school boundaries for one or more school districts, a user visits a website or application hosting the interactive boundary mapper 102. In one implementation, interactive boundary mapper 102 displays a form field for selecting a geographic location for a residence. The user may search for a geographic location in various ways using the interactive boundary mapper 102. For example, the user may search by: a specific address or geographic coordinates; a general area (e.g., by drawing a shape over a map); selecting, entering or otherwise identifying one or more specific schools; and/or the like. The form field may automatically fill the geographic location as the user enters information. For example, the form field may autofill an address based on information previously input by the user and update the address as the user continues to enter additional information. In one implementation, the form field is linked to the Google Maps™ Engine for selecting a geographical location.

Once the interactive boundary mapper 102 receives the selected residence, the interactive boundary mapper 102 determines whether the selected residence is within the school district boundary. In one implementation, the interactive boundary mapper 102 converts the school district boundary to geographical coordinates and compares those coordinates to the geographical coordinates of the selected residence to determine whether the selected residence is within the school district boundary. If the selected residence is outside the boundary, a pin is returned showing the location on a map with a notification indicating that the residence is outside the school district.

If the selected residence is within the school district, the interactive boundary mapper 102 pierces the union layer with a pin corresponding to the geographical location of the residence. As discussed herein, the union layer generally is a union of respective layers, each with boundaries corresponding to a particular type of school, and associated information. For example, the union layer may be a union of layers for the school district's respective schools, with each layer having boundaries within the school district for a particular school level (e.g., elementary school, middle school, and high school boundaries), and information associated with the schools (e.g., data generated from the building variables 204) or community (e.g., real estate agents serving the area, businesses serving the area, data generated from routing variables 210, etc.).

In one implementation, the union layer is invisible to the user until a mouse icon hovers over the district layer displaying the school district boundary. When the user hovers over the district layer within the school district boundary, the union layer will display boundaries for the various schools of attendance within the school district. Similarly, the union layer may be invisible to the user until the user touches a map on a touchscreen, which then displays boundaries for the various schools of attendance within the school district. The boundaries may include color, transparency, or pattern coding or other visually distinguishing features to facilitate the identification and understanding of the schools of attendance for various geographical locations. In one implementation, hovering over a particular address will highlight or emphasize the boundary corresponding to the schools of attendance for the address and/or generate a popup box identifying the names of the schools of attendance. As the user moves the mouse icon or his finger over the district layer, the interactive boundary mapper 102 automatically updates the emphasized boundary and identified schools of attendance in real time. Similarly, as the user physically moves, the interactive boundary mapper 102 automatically updates the emphasized boundary and identified schools of attendance in real time based on a detected geographic location of the user using GPS.

Figure 3:
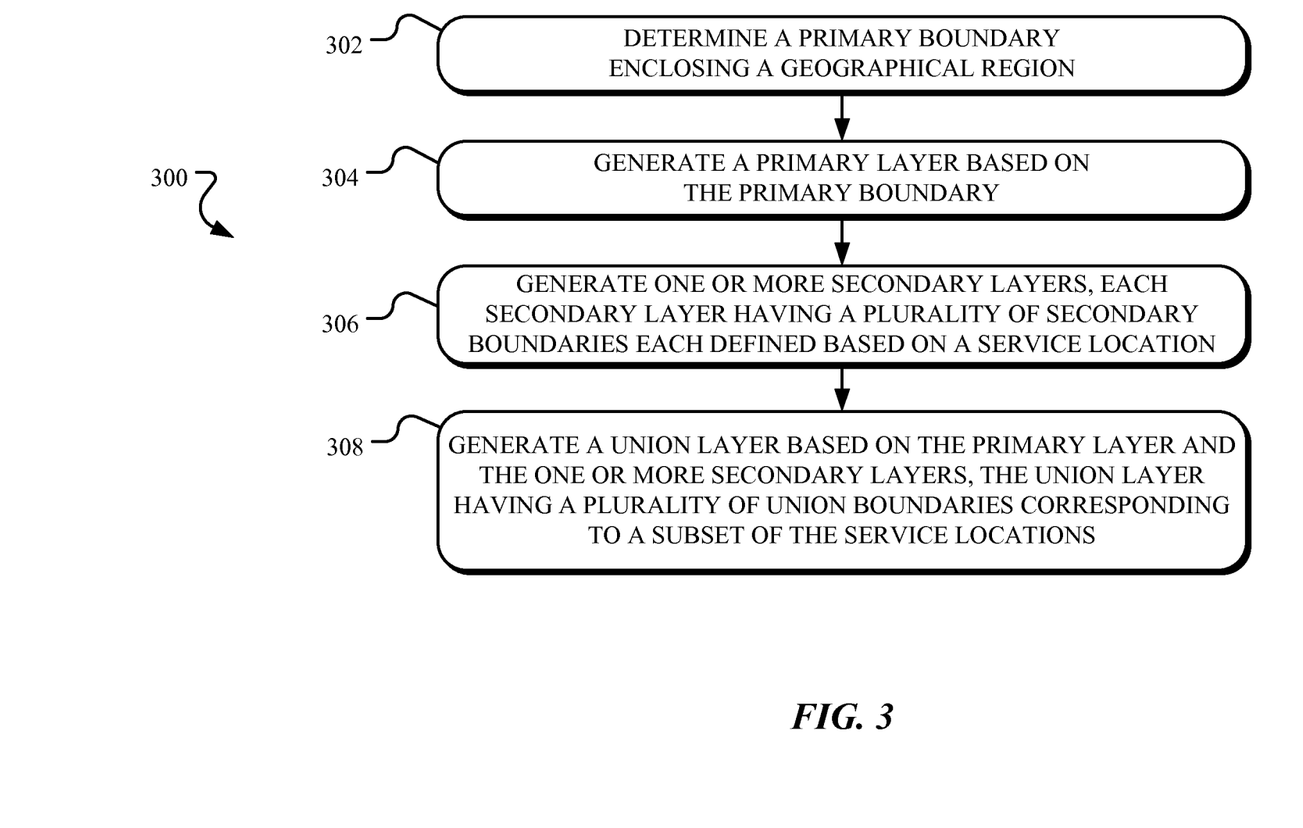
FIG. 3 shows example operations for generating a union layer having a plurality of boundaries corresponding to service sites.

Turning to FIG. 3, example operations 300 for generating a union layer having a plurality of boundaries corresponding to service sites are shown. In one implementation, an operation 302 determines a primary boundary enclosing a geographical region. The primary boundary may be, without limitation, a school district boundary, an outer limit to a geographical region (e.g., a continent, country, state, town, county, city, neighborhood, etc.), an outer limit to a geographical region serviced by a business, and the like. The operation 302 may determine the primary boundary by converting a polygon to geographic coordinates or otherwise obtaining geographic coordinates for the primary boundary. An operation 304 generates a primary layer based on the primary boundary. The primary layer may include one or more primary boundaries.

An operation 306 generates one or more secondary layers. Each of the secondary layers are generated based on a plurality of secondary boundaries, and each of the secondary boundaries are defined based on a service location. For example, the service location may be a particular school that defines a boundary for attendance for the particular school. The operation 306 generates a secondary layer for the boundaries for the same school type. For example, an elementary school layer may be generated based on all the boundaries for elementary schools, a middle school layer may be generated based on all the boundaries for middle schools, and a high school layer may be generated based on all the boundaries for high schools. The service sites may be physical buildings having a particular area to which service is provided (e.g., a store or business may be identified from which a delivery or other service boundary is defined) or be otherwise identified (e.g., a particular time zone may be identified by a city from which the time zone boundary is defined). The boundary information for the primary boundary and the secondary boundaries may be obtained in a variety of formats, including, but not limited to, shapefiles, KML, KMZ, geographic coordinates (longitude and latitude), XML, and the like.

An operation 308 generates a union layer based on the primary layer and the one or more secondary layers. In one implementation, the union layer has a plurality of union boundaries corresponding to a subset of the service sites. For example, the subset of service sites may correspond to schools of attendance across the various school types with the union boundaries corresponding to the boundary for each of the schools of attendance. Stated differently, a subset of service sites may be a particular elementary school, a particular middle school, and a particular high school, and a union boundary may be the boundary corresponding to the geographical area that will attend the particular elementary school, the particular middle school, and the particular high school.

Figure 4:
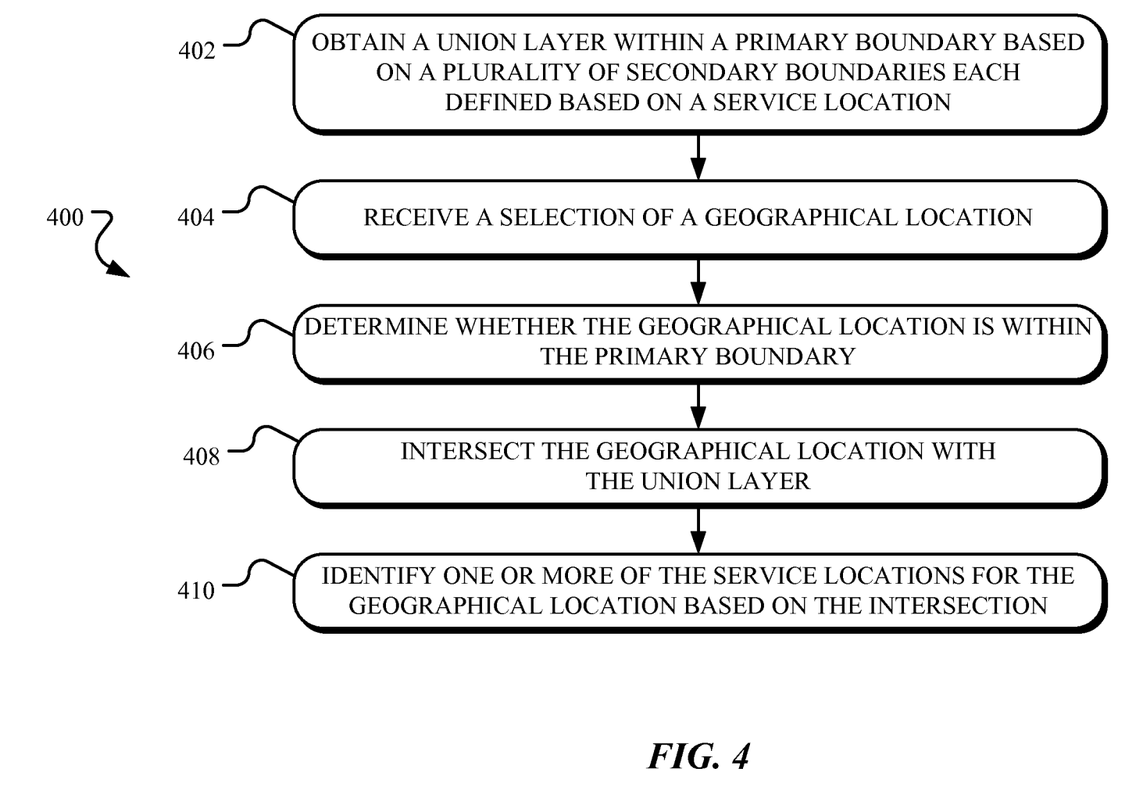
FIG. 4 illustrates example operations for identifying one or more service sites for a selected geographical location using the union layer.

Referring to FIG. 4, which illustrates example operations 400 for identifying one or more service sites for a selected geographical location using the union layer, in one implementation, an operation 402 obtains a union layer within a primary boundary based on a plurality of secondary boundaries, each defined based on a service location.

An operation 404 receives a selection of a geographical location, which may be a residence, specific address, specific geographical coordinates, a general area, specific service sites (e.g., schools), or the like. An operation 406 determines whether the geographical location is within the primary boundary. if the geographical location is within the primary boundary, an operation 408 intersects the geographical location with the union layer, and an operation 410 identifies one or more of the service sites (e.g., schools of attendance at the elementary, middle, and high school levels) for the geographical location based on the intersection.

Figure 5:
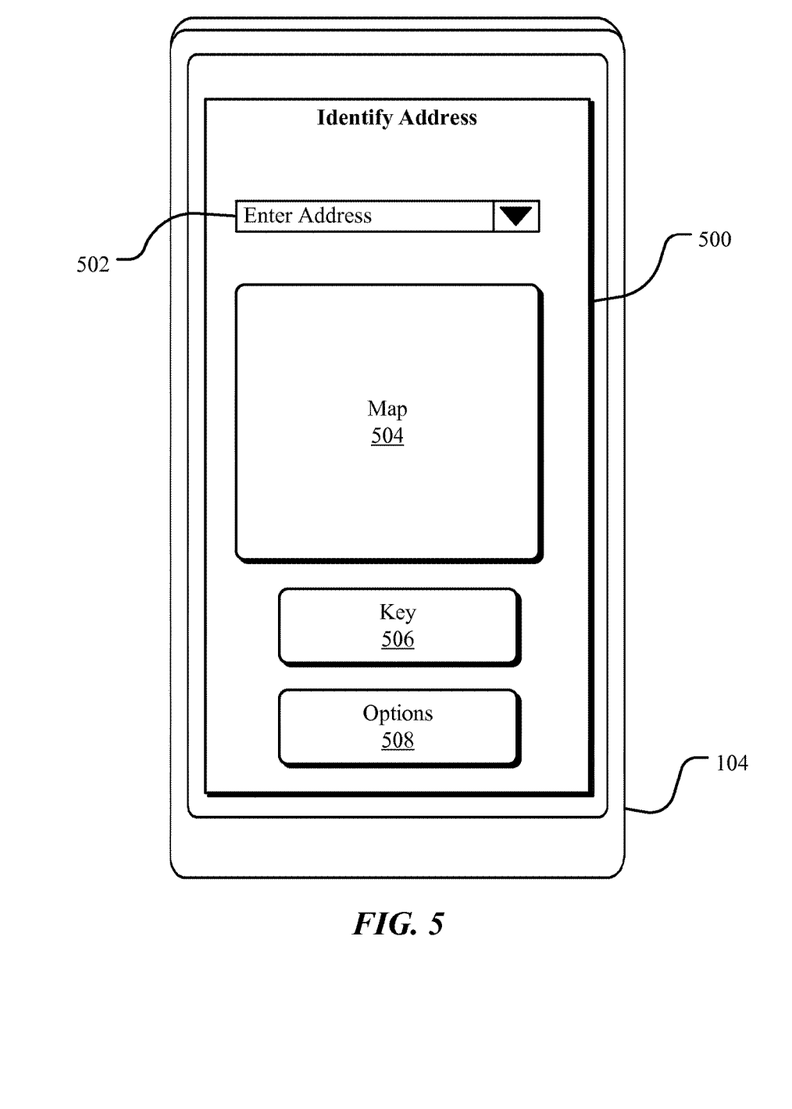
FIG. 5 shows an example identify address user interface generated by the interactive boundary mapper and displayed in a browser window with a user device.
Figure 6:
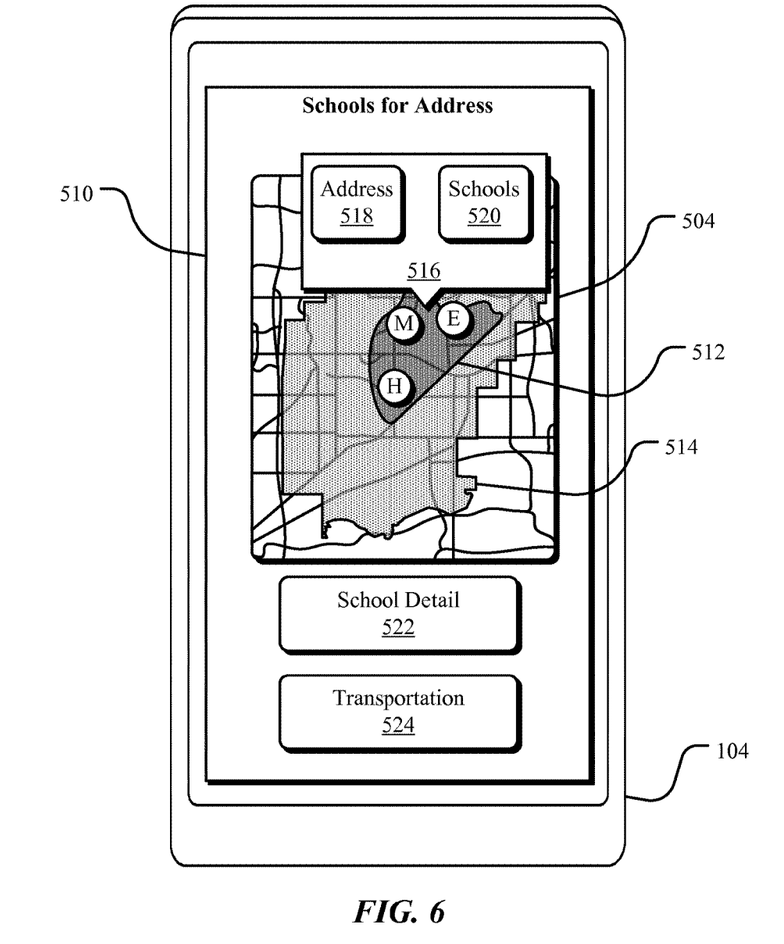
FIG. 6 illustrates an example schools for address user interface generated by the interactive boundary mapper and displayed in a browser window with the user device.
Figure 7:
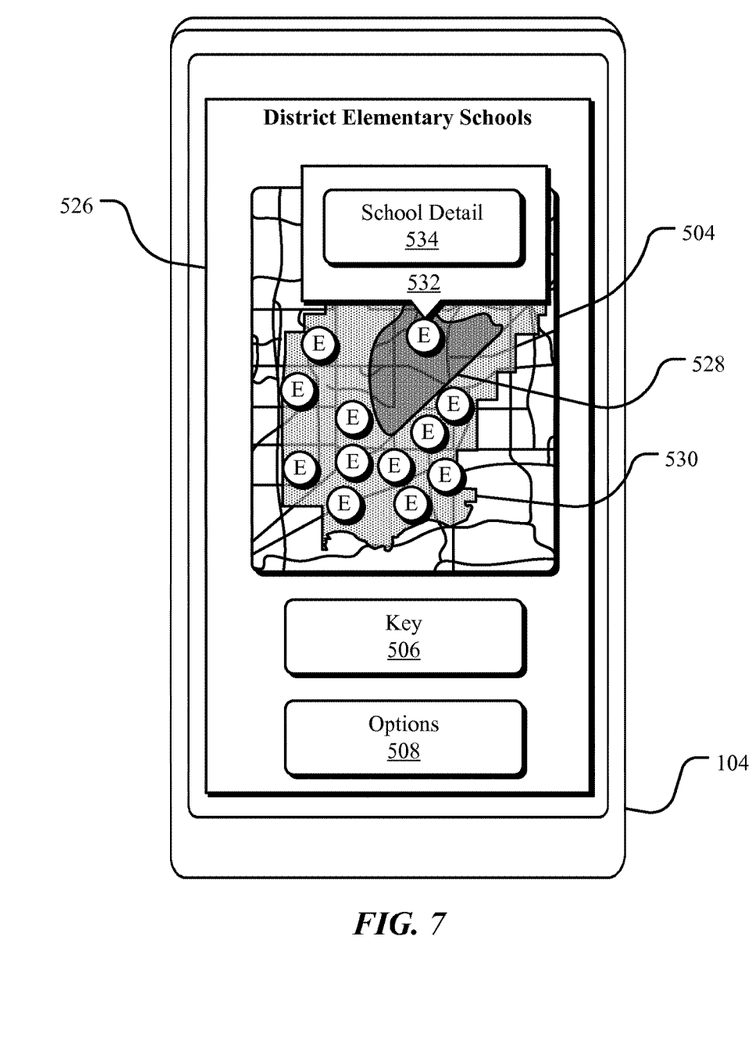
FIG. 7 shows a district elementary schools user interface generated by the interactive boundary mapper and displayed in a browser window with the user device.

FIGS. 5-7 show example user interfaces generated by the interactive boundary mapper 102 and displayed in a browser window of the user device 104 through which access to and interactions with the network environment 100 and interactive boundary information are provided. It will be appreciated by those skilled in the art that such depictions are exemplary only and not intended to be limiting.

Turning to FIG. 5, an example identify address user interface 500 is shown. In one implementation, the identify address user interface 500 includes a location field 502 for inputting and/or selecting a particular geographic location in the form of a street address, geographic coordinates, and/or the like. A user may begin inputting an address using the location field 502, and the location field 502 may display suggested addresses that are continuously refined as more of the address is input. In one implementation, the suggested addresses are limited to or otherwise prioritized based on bounds of a map 504. For example, if the map 504 is focused on Denver, Colo., the addresses suggested by the location field 502 are displayed for Denver, Colo. first. A particular geographic location may be selected or otherwise detected using the location field 502, the map 504, and/or using GPS. The map 504 may include a street view, satellite view, or other views or graphics in some implementations.

One or more school districts, schools of attendance, transportation mapping, and/or other preferences or layer may be selected through one or more options 508 and displayed with a key 506. Where the interactive boundary mapper 102 is deployed on a school district server, a corresponding school district is automatically selected. The options 508 may include, without limitation, district boundaries, elementary school boundaries, middle school boundaries, high school boundaries, elementary schools, middle schools, high schools, alternative schools, charter schools, preschools, administrative buildings, board of education boundaries, county boundaries, local school district boundaries, biking paths, trails, bus routes, and/or the like.

In one implementation, if the particular geographic location is outside a boundary of a selected school district or school of attendance, an address returned out of district notification will be displayed with the identify address user interface 500. The address returned out of district notification may include an address marker showing the particular geographic location compared to the boundary of the selected school district or school of attendance on the map 504.

If the particular geographic location is within the boundary of a selected school district or school of attendance, a schools for address user interface 510 may be displayed, as shown in FIG. 6. Similarly, if an address is input using the identify address user interface 500 without selecting a particular school of attendance or school district, the schools for address user interface 510 may be generated showing results for the particular geographic location.

In one implementation, the schools for address user interface 510 includes the map 504 displaying a schools of attendance boundary 512 within a school district boundary 514 for the particular geographic location. Address markers may be displayed showing a location of each school of attendance compared to the particular geographic location. As shown in the example of FIG. 6, the address markers may be labeled to distinguish between the types of schools of attendance. For example, the elementary school may be labeled with an "E", the middle school may be labeled with an "M", and the high school may be labeled with an "H." In some implementations, animations, such as bounding address markers or icons, may be provided to indicate action, selection, processing, relationship (e.g., directions between two points), and/or the like.

An information window 516 may popup from the particular geographic location detailing an address 518 of the particular geographic location and the schools of attendance 520. School detail 522 and transportation information 524 for one or more of the schools of attendance may be displayed. The school detail 522 may include, without limitation, school name, school address, school website, directions to the school, images of the school, contact information for the school, grades serviced by the school, a feeder system for the school, and/or the like. The transportation information 524 may include bus routes, bike paths, directions, and/or the like, as well as travel time. In one implementation, as the user hovers over or touches different particular geographic locations, the boundaries 512 and/or 514, the information window 516, the school detail 522, and/or the transportation 524 updates in real time.

Turning to FIG. 7, a district elementary schools user interface 526 is shown. In one implementation, a selected school district boundary 530 is displayed on the map 504. Using the options 508, the user may direct the interactive school mapper 102 to display all the elementary schools in the selected school district boundary 530. The elementary schools may be displayed with address markers notated with an "E" as shown in FIG. 7 and/or listed in the key 506. The user may select one of the elementary schools to display an elementary school boundary 528 for the selected elementary school. In one implementation, selecting the elementary school may further provide a window 532 with school detail 534 for the selected elementary school. The school detail 534 may include, without limitation, school name, school address, school website, directions to the school, images of the school, contact information for the school, grades serviced by the school, a feeder system for the school, and/or the like. Selecting (e.g., through hovering or tactile input) another of the elementary schools will update the selected school district boundary 530 and the school detail 534 in real time.

Figure 8:
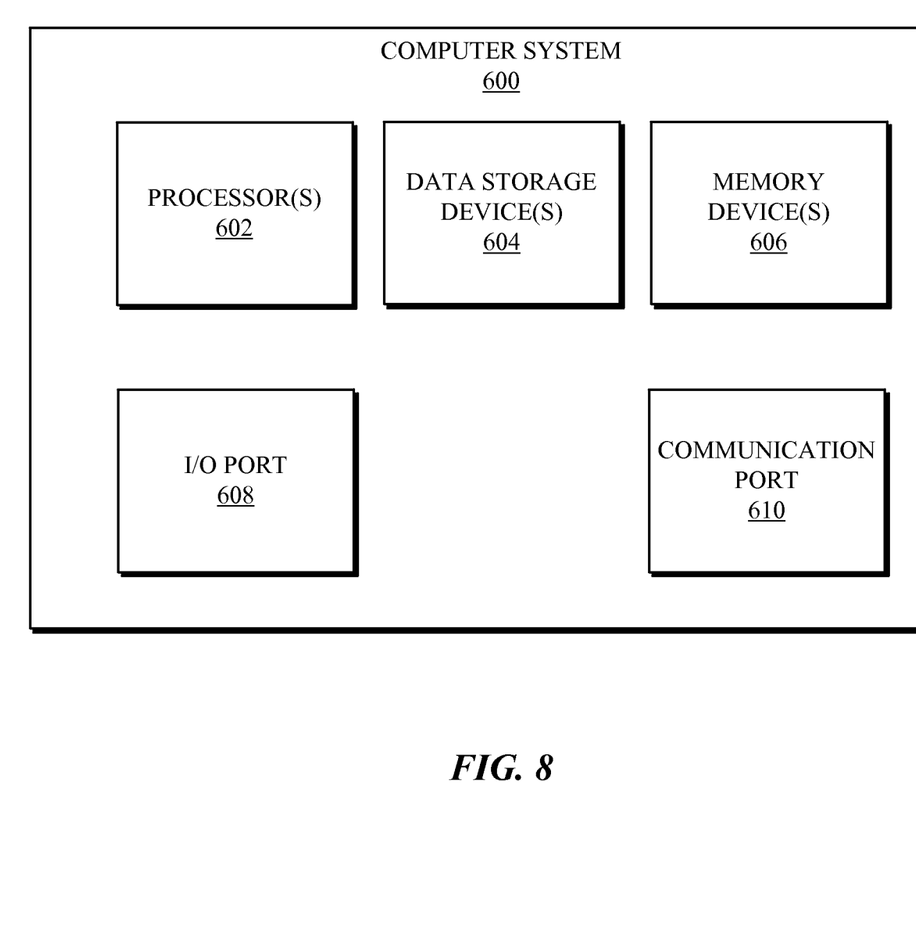
FIG. 8 is an example computing system that may be specifically configured to implement the various systems and methods discussed herein.

Referring to FIG. 8, a detailed description of an example computing system 600 having one or more computing units that may implement various systems and methods discussed herein is provided. The computing system 600 may be applicable to the user devices 104, the server 110, and other computing or network devices. It will be appreciated that specific implementations of these devices may be of differing possible specific computing architectures not all of which are specifically discussed herein but will be understood by those of ordinary skill in the art.

The computer system 600 may be a computing system is capable of executing a computer program product to execute a computer process. Data and program files may be input to the computer system 600, which reads the files and executes the programs therein. Some of the elements of the computer system 600 are shown in FIG. 8, including one or more hardware processors 602, one or more data storage devices 604, one or more memory devices 608, and/or one or more ports 608-610. Additionally, other elements that will be recognized by those skilled in the art may be included in the computing system 600 but are not explicitly depicted in FIG. 8 or discussed further herein. Various elements of the computer system 600 may communicate with one another by way of one or more communication buses, point-to-point communication paths, or other communication means not explicitly depicted in FIG. 8.

The processor 602 may include, for example, a central processing unit (CPU), a microprocessor, a microcontroller, a digital signal processor (DSP), and/or one or more internal levels of cache. There may be one or more processors 602, such that the processor 602 comprises a single central-processing unit, or a plurality of processing units capable of executing instructions and performing operations in parallel with each other, commonly referred to as a parallel processing environment.

The computer system 600 may be a conventional computer, a distributed computer, or any other type of computer, such as one or more external computers made available via a cloud computing architecture. The presently described technology is optionally implemented in software stored on the data stored device(s) 604, stored on the memory device (s) 606, and/or communicated via one or more of the ports 608-610, thereby transforming the computer system 600 in FIG. 8 to a special purpose machine for implementing the operations described herein. Examples of the computer system 600 include personal computers, terminals, workstations, mobile phones, tablets, laptops, personal computers, multimedia consoles, gaming consoles, set top boxes, and the like.

The one or more data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. The data storage devices 604 may include, without limitation, magnetic disk drives, optical disk drives, solid state drives (SSDs), flash drives, and the like. The data storage devices 604 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 600 includes one or more ports, such as an input/output (I/O) port 608 and a communication port 610, for communicating with other computing, network, or vehicle devices. It will be appreciated that the ports 608-610 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 600 via the I/O port 608. For example, an electrical signal generated within the computing system 600 may be converted to another type of signal, and/or vice-versa. In one implementation, the environment transducer devices sense characteristics or aspects of an environment local to or remote from the computing device 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 600, such as, physical movement of some object (e.g., a mechanical actuator), heating or cooling of a substance, adding a chemical substance, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 610 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 610 may communicate with an antenna or other link for electromagnetic signal transmission and/or reception.

In an example implementation, the interactive boundary mapper 102, geographical data, boundary data, associated data, school data, data associated with the variables 202-210, a plurality of internal and external databases, source databases, cached data on servers, and/or software and other modules and services may be embodied by instructions stored on the data storage devices 604 and/or the memory devices 606 and executed by the processor 602. Boundary mapping software and other modules and services may be embodied by instructions stored on such storage systems and executed by the processor 602.

The system set forth in FIG. 8 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for interactive school boundary mapping, the method comprising:

generating a school district layer for a particular school district from a set of school district boundary variables, the school district layer including a school district polygon corresponding to a district boundary of the particular school district;

generating an elementary school polygon from a set of elementary school boundary variables, the elementary school polygon corresponding to an elementary school boundary of a particular elementary school;

generating an elementary school layer corresponding to a plurality of elementary schools within the particular school district, the elementary school layer having a plurality of unique elementary school polygons each corresponding to one of the plurality of elementary schools, the plurality of unique elementary school polygons including the elementary school polygon;

generating a middle school polygon from a set of middle school boundary variables, the middle school polygon corresponding to a middle school boundary of a particular middle school;

generating a middle school layer corresponding to a plurality of middle schools within the particular school district, the middle school layer having a plurality of unique middle school polygons each corresponding to one of the plurality of middle schools, the plurality of unique middle school polygons including the middle school polygon;

generating a high school polygon from a set of high school boundary variables, the high school polygon corresponding to a high school boundary of a particular high school;

generating a high school layer corresponding to a plurality of high schools within the particular school district, the high school layer having a plurality of unique high school polygons each corresponding to one of the plurality of high schools, the plurality of unique high school polygons including the high school polygon;

generating a union layer based on an interrelationship between the school district layer, the elementary school layer, the middle school layer, and the high school layer;

layering the union layer over a geographic map layer in a graphical user interface, the union layer being invisible in the graphical user interface;

receiving a selection of a geographic location;

determining whether the geographic location is within the particular school district by converting the school district polygon into geographical coordinates and comparing the geographical coordinates to the geographic location;

generating a notification when the geographic location is determined to be outside the particular school district, the notification displayed with the graphical user interface;

intersecting the union layer at an intersection point corresponding to the geographic location when the geographic location is determined to be within the particular school district;

identifying the particular elementary school, the particular middle school, and the particular high school as being schools of attendance for the geographical location based on a determination that the intersection point corresponds to the elementary school polygon, the middle school polygon, and the high school polygon; and displaying the schools of attendance for the particular geographic location with the graphical user interface.

2. The method of claim 1, wherein displaying the schools of attendance includes displaying the elementary school boundary of the particular middle school, the middle school boundary of the particular middle school, and the high school boundary of the particular middle school, along with a name and location of each of the particular elementary school, the particular middle school, and the particular high school.

3. The method of claim 2, wherein each of the elementary school boundary of the particular middle school, the middle school boundary of the particular middle school, and the high school boundary of the particular middle school is displayed with a different visual indication.

4. The method of claim 3, wherein the different visual indications include at least one of color or pattern.

5. The method of claim 1, wherein the geographic location is visually represented in the graphical user interface as a pin.

6. The method of claim 5, wherein the pin is annotated with a description of the schools of attendance in the graphical user interface.

7. The method of claim 1, wherein each of the school district layer, the elementary school layer, the middle school layer, and the high school layer is maintained as a separate geographic information service file, and the union layer is generated based on a consolidation of the separate geographic information service files into an obfuscated file.

8. The method of claim 1, wherein the selection of the geographic location includes an input of an address or coordinates into a location field of the graphical user interface.

9. The method of claim 1, wherein the selection of the geographic location includes determining a location over which an input device is hovering in the graphical user interface.

10. The method of claim 1, wherein the selection of the geographic location includes detecting the geographic location using Global Positioning System.

11. The method of claim 1, wherein union layer is deployed on a server associated with the particular school district and the graphical user interface is customized for the particular school district.

12. The method of claim 1, wherein each of the plurality of the unique elementary school polygons, the plurality of unique middle school polygons, and the plurality of unique high school polygons are automatically updated with any changes by an associated administration.

13. The method of claim 1, wherein each of the plurality of the unique elementary school polygons, the plurality of unique middle school polygons, and the plurality of unique high school polygons corresponds to at least one of a current boundary, a future boundary, a prospective boundary, or a transfer boundary.

* * * * *